United States Patent [19]

Peters

[11] 4,067,547
[45] Jan. 10, 1978

[54] FENCE FOR FEED LOTS OR THE LIKE
[76] Inventor: Emil Peters, P.O. Box 276, Linn, Kans. 66953
[21] Appl. No.: 706,883
[22] Filed: July 19, 1976
[51] Int. Cl.² ............................................. A01G 17/06
[52] U.S. Cl. ........................................ 256/23; 256/25; 256/73
[58] Field of Search ....................... 256/23, 24, 25, 26, 256/59, 65, 73; 272/5; 119/20, 29, 82; 403/292, 295

[56] References Cited

U.S. PATENT DOCUMENTS

| 194,724 | 8/1877 | Reed et al. | 256/24 |
| 2,762,639 | 9/1956 | Molter et al. | 256/65 UX |
| 3,096,079 | 7/1963 | Winn | 256/24 |
| 3,499,631 | 3/1970 | Heldenbrand | 256/25 |
| 3,598,349 | 8/1971 | Drake | 403/292 X |

FOREIGN PATENT DOCUMENTS

| 227,079 | 2/1960 | Australia | 256/24 |
| 1,255,724 | 12/1971 | United Kingdom | 256/59 |
| 511,190 | 8/1939 | United Kingdom | 403/292 |
| 1,006,996 | 10/1965 | United Kingdom | 256/59 |
| 947,343 | 1/1964 | United Kingdom | 403/292 |

Primary Examiner—Andrew V. Kundrat
Attorney, Agent, or Firm—Edwin H. Crabtree; John H. Widdowson

[57] ABSTRACT

A fence for feed lots or the like having prefabricated fence panels mounted on vertical fence post. The fence is completely portable and can be quickly constructed, torn down, moved, or added to depending on the changing conditions of enclosing animals of various sizes and numbers.

7 Claims, 6 Drawing Figures

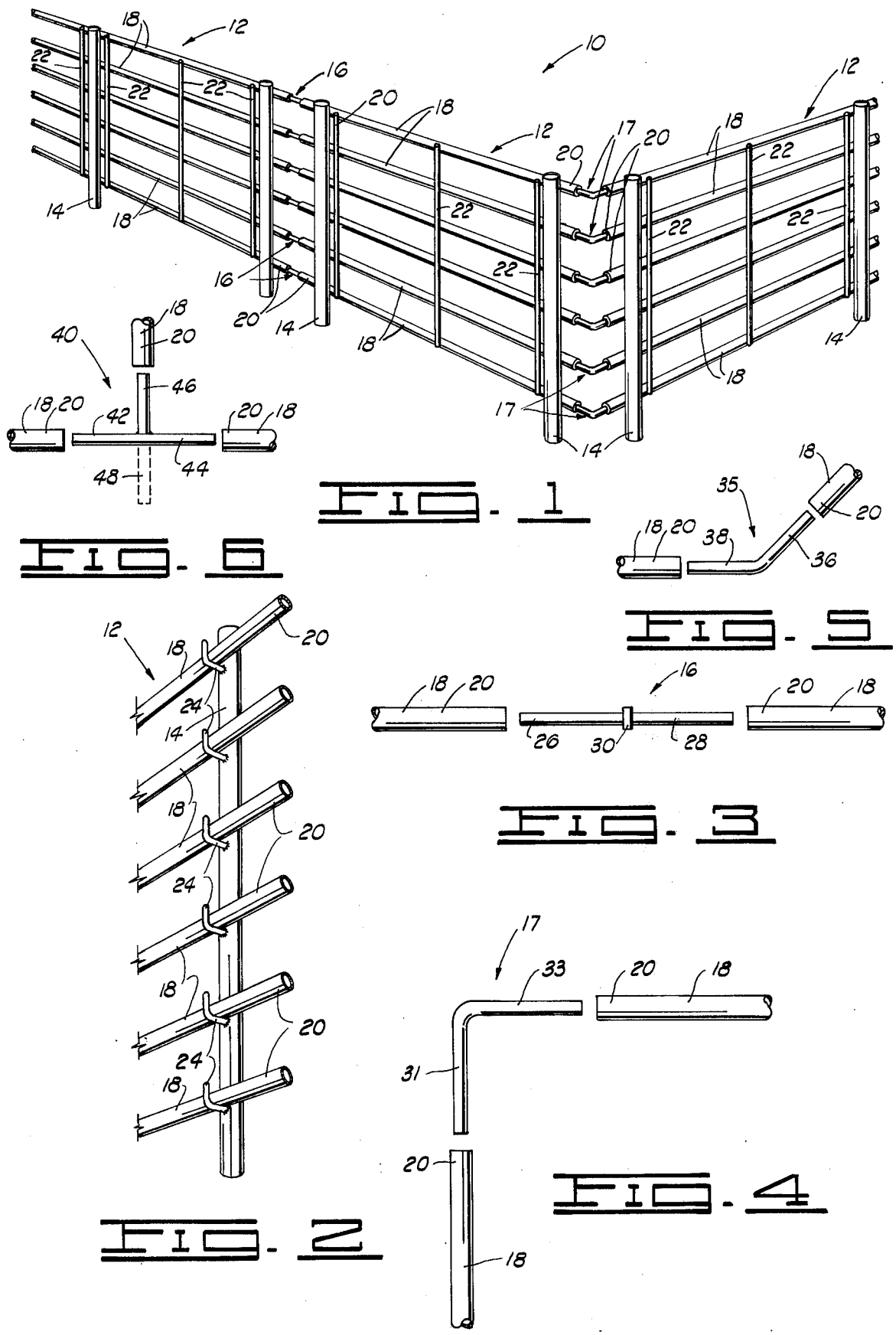

FENCE FOR FEED LOTS OR THE LIKE

BACKGROUND OF THE INVENTION

This invention relates generally to fences and more particularly but not by way of limitation to a fence having prefabricated fence panels for use in a feed lot or the like.

Heretofore various types of wooden and metal fencing has been used for enclosing animals in feed lots, stockyards, slaughter houses, rodeos, animal shows, or the like. Generally the fencing is permanently installed with vertical posts mounted in the ground surface. Attached to the vertical posts are horizontal rails made of either wood or metal. If the rails are not used, normally wire mesh or barbed wire is attached to the vertical posts. Often the metal and wooden railing is designed to be quickly detached from the vertical post. The railing can then be removed and used elsewhere.

None of the prior art fences disclose the novel structure of the subject fence as herein disclosed.

SUMMARY OF THE INVENTION

The subject invention is rugged in design and can be used over and over in the building of various size fence enclosures.

The invention includes portable prefabricated fence panels that can be quickly installed and removed from vertical fence posts mounted in the ground surface. The panels are rigidly secured together by metal connectors which are slidably received in the panels.

The portable fence panels can be attached to each other in a straight line or at various angles to each other depending on the type of enclosure required.

The fence is convenient and versatile because of the portable features, thereby meeting the changing conditions of a feed lot or the like where the size and number of animals will vary from day to day.

The fence includes prefabricated fence panels having a plurality of parallel horizontal tubing attached to a plurality of parallel vertical bracing. The fence panels are suspended from vertical posts mounted in the ground surface. The fence panels are connected to each other by metal tubing connectors which are received in the ends of the horizontal tubing.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a perspective view of the portable fence.

FIG. 2 is a perspective view of a portion of the fence panel mounted on a vertical post.

FIG. 3 illustrates a straight metal tubing connector.

FIG. 4 illustrates a right angle tubing connector.

FIG. 5 illustrates an angular tubing connector.

FIG. 6 illustrates an alternate embodiment of the tubing connector.

DETAILED DESCRIPTION OF THE DRAWINGS

In FIG. 1 the portable fence is designated by general reference numeral 10. The fence 10 includes prefabricated fence panels 12 suspended on vertical posts 14 which are mounted in the ground surface. The fence panels 12 are secured to each other by straight tubing connectors 16 and angular tubing connectors 17. The straight connectors 16 are discussed in detail under FIG. 3. The angular tubing connectors are discussed in detail in FIGS. 4 and 5.

The panels 12 include parallel, horizontal tubing 18 having hollow end portions 20 for receiving the connectors 16 and 17 therein. The tubing 18 is held in place by vertical bracing 22 which is welded thereto.

In this view adjacent and parallel fence panels 12 are attached together by straight connectors 16. An additional panel 12 is attached to an adjacent panel 12 and at an angle thereto through the use of the angular tubing connectors 17.

The length of the fence 10 can be lengthen or shorten by the addition or subtraction of the panels 12 connected together by the straight connectors 16. When it is desired to make a turn in the fence 10 the angular connectors 17 are used to join the panel 12 at an angle to the adjacent panel 12.

In FIG. 2 the panel 12 is shown wherein a portion of the horizontal tubing 18 is suspended on the vertical post 14 by hooks 24. The hooks 24 are welded along the length of the post 14 and are in a spaced relationship thereto for receiving each of the parallel horizontal tubing 18 thereon. By lifting the panel 12 upward and outward from the hooks 24 and the post 14, the panel 12 can be quickly removed for use at a later date or for building a portable fence 10 at a different location.

In FIG. 3 a straight connector 16 is illustrated having a first end portion 26 and a second end portion 28 which is parallel to the first end portion 26. The end portions 26 and 28 are separated by a flange portion 30. The connector 16 attaches adjacent panels 12 in parallel by slidably inserting the first end portion 26 into the hollow end portion 20 of the horizontal tubing 18 of one panel 12 and slidably inserting the second end portion 28 into the hollow end portion 20 of the horizontal tube 18 of the adjacent parallel panel 12. The connector 16 is prevented from sliding completely into the hollow end portion 20 by the flange 30 which has a greater diameter than the inner diameter of the tubing 18.

In FIG. 4 the angular connector 17 is illustrated having a first end portion 31 at right angles to a second end portion 33. This type of connector 17 is used when it is desired to connect the panels 12 wherein the horizontal tubing 18 is at right angles to the tubing 18 of the adjacent panel 12.

In FIG. 5 an angular connector 35 is disclosed having a first end portion 36 at an oblique angle to a second end portion 38. Here again this type of angular connector 35 would be used in attaching panels 12 where it is desired to have panels 12 at an angle to each other.

FIG. 6 illustrates another embodiment of a "T" shaped connector 40 having a first end portion 42, a second end portion 44, and a third end portion 46 attached to the center of the connector 40. This type of connector would be used for attaching adjacent panels 12 and in addition receiving a panel at right angles to the two adjacent parallel panels 12. Shown in dotted lines, is an additional fourth end portion 48 where it is desired to connect four panels together at right angles to each other. This type of connector would have an "X" shape.

It can be appreciated by those skilled in the art of fencing feed lots or the like that various configurations of the tubing connectors may be made other than those illustrated herein for joining fence panels 12 without departing from the scope of the invention.

In operation the prefabricated fence panels 12 can be made having various lengths and widths using the parallel horizontal tubes 18 and the vertical braces 22. The vertical post 14 with the hooks 24 attached thereto may or may not be permanently mounted in the ground surface. The portable fence 10 is quickly installed by determining the area to be enclosed by the fence 10. The area to be fenced will be determined by the number of animals to be contained for a given time. The fence panels 12 are then suspended on the hooks 24 and the panels 12 secured together by the tubing connectors 16, 17, 35, and 40. The connectors are quickly received inside the horizontal tubing 18 thereby rigidly holding the panels 12 together. When it is desired to remove the panels, the panels 12 are lifted upward and outward away from the hooks 24 and the vertical posts 14 and the connectors removed therefrom.

Changes may be made in the construction and arrangement of the parts or elements of the embodiment as disclosed herein without departing from the spirit or scope of the invention as defined in the following claims.

I claim:

1. A portable fence for feed lots or the like, the fence comprising:
   prefabricated fence panels, said panels including a plurality of parallel horizontal tubing, said tubing held in place by a plurality of parallel vertical bracing attached thereto;
   vertical posts mounted in the ground surface and having means supporting said panels thereon, the ends of said parallel horizontal tubing extending across and axially beyond said posts; and
   tubing connectors received in the ends of said horizontal tubing for connecting the ends of said adjacent fence panels to form a fence enclosure.

2. The fence as described in claim 1, wherein said posts include a plurality of hooks attached to said posts and in a spaced relationship along the length thereof, said hooks extending outwardly with the ends of said hooks extending upwardly, a portion of said horizontal tubing received on the top of said hooks and retained between the ends of said hooks and the sides of said posts for suspending said panels therefrom.

3. The fence as described in claim 1, wherein said tubing connectors include a first end portion, a second end portion, and a flange portion around the circumference of said connector and dividing the first and second end portions, the first end portion of said connector received in one end of said tubing of one of said panels, the second end portion of said connector received in one end of said tubing of an adjacent panel, the flange portion of said connector having a greater diameter than the inner diameter of said tubing to prevent the connector from sliding completely into the end of said tubing.

4. The fence as described in claim 1, wherein said tubing connectors include a first end portion and a second end portion disposed at an angle to the first end portion for connecting together adjacent panels at an angle to each other.

5. The fence as described in claim 1, wherein said tubing connectors is "T" shaped and includes a first end portion, a second end portion, and a third end portion at a right angle to the first end portion and second end portion for connecting together three panels with one panel at a right angle to the other two panels.

6. The fence as described in claim 1, wherein said tubing connectors is "X" shaped and including a first end portion, a second end portion, and a third end portion and fourth end portion at a right angle to the first end portion and second end portion for connecting together four panels at right angles to each other.

7. A portable fence for feed lots or the like, the fence comprising:
   prefabricated fence panels, said panels including a plurality of parallel horizontal tubing, annular in section, said tubing held in place by a plurality of parallel vertical bracing attached thereto;
   a plurality of hooks attached to vertical posts mounted in the ground surface, said hooks extending outwardly with the ends of said hooks extending upwardly, said hooks disposed in a spaced relationship along the length of said posts, a portion of said annular horizontal tubing received on top of said hooks and retained between the ends of said hooks and said posts, the ends of said horizontal tubing extending across and axially beyond said posts; and
   annular tubing connectors received in the ends of said annular horizontal tubing for connecting together the ends of said horizontal tubing to adjacent fence panels to form a fence enclosure.

* * * * *